June 23, 1936.  J. B. BRELSFORD  2,044,768
COUPLING
Filed July 26, 1934
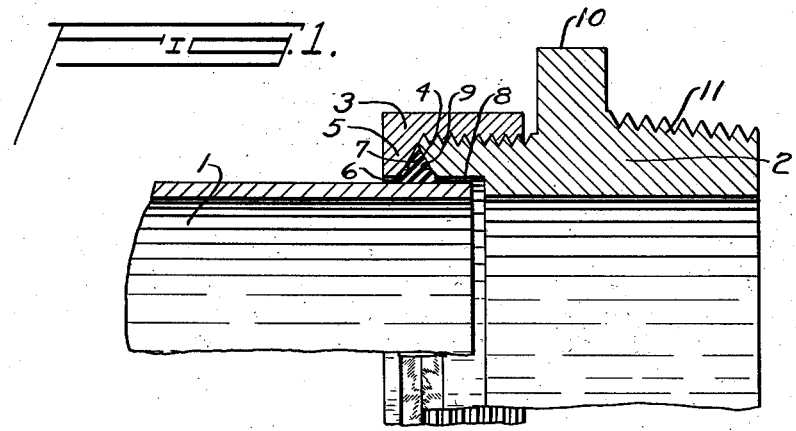
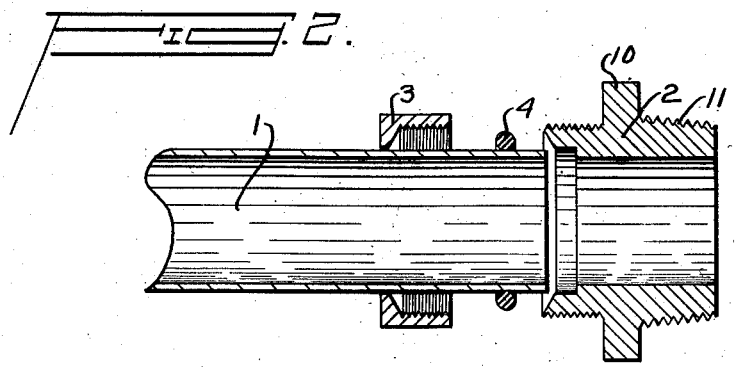
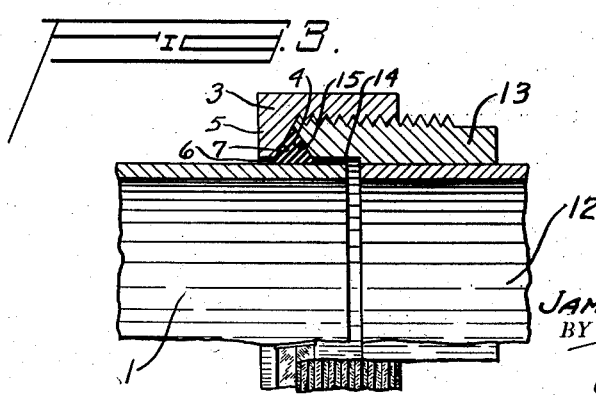
INVENTOR
JAMES B. BRELSFORD
BY
ATTORNEYS Patented June 23, 1936

2,044,768

UNITED STATES PATENT OFFICE 2,044,768

COUPLING

James B. Brelsford, Dayton, Ohio

Application July 26, 1934, Serial No. 737,048

3 Claims. (Cl. 285—122)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to the joining together of the adjacent ends of elongated members or the joining together of the end of an elongated member to a fitting of desired form.

It is another object of the invention to provide a coupling which will permit a certain degree of flexibility between adjacent member ends or a member end and a fitting attached thereto.

A further object of the invention is to provide fluid line couplings which will remain sealed under predetermined operating pressures without suffering deformation reducing the effective internal area of adjacent tubing ends.

A still further object of the invention is to provide fluid line couplings which may be subjected to severe and continuous vibration and still remain sealed under predetermined operating pressures.

With the foregoing and other objects in view, which will appear as the description proceeds, the invention consists of certain new and novel improvements in fluid line connectors, which will hereinafter be more fully illustrated and described in the accompanying drawing and more particularly pointed out in the appended claims.

Referring to the drawing, in which numerals of like character designate similar parts throughout the several claims:

Fig. 1 is an enlarged cross-sectional view of one form of my invention;

Fig. 2 is an exploded view, in cross-section, of the above figure;

Fig. 3 is an enlarged cross-sectional view of another form of my invention.

In Fig. 1, a tube 1 is flexibly secured to a fitting 2 by means of a collar 3 and an annular resilient ring 4. It will be noted that the collar 3 is provided at one end with an inwardly extending flange 5 having an inside diameter sufficiently in excess of the outside diameter of the tube 1 to provide a gap 6 therebetween. The collar 3 is also provided with a conical surface 7 forming an annular space extending outwardly and blending into internal threads provided in said collar. The inside diameter of the fitting 2 corresponds to the inside diameter of the tube 1. A counterbore 8, identical in diameter to the inside diameter of the flange 5, is further provided in the fitting 2. The outer extremity of the counterbore 8 terminates in an outwardly extending conical surface 9 forming an annular space blending into external threads provided in the fitting 2. The fitting 2 is also provided with a hexagonal flange 10 and pipe thread 11.

Fig. 2 is an exploded view of the parts of Fig. 1, normal size. It should be particularly noted that the ring 4 is circular in cross-section and that it is loosely slipped over the end of the pipe 1. It is essential that the inner diameter of the ring 4 closely approximates the outside diameter of the tube 1. A discussion of the nature of the annular space retaining the ring 4 can best be illustrated by cross reference to Figs. 1 and 3.

In Fig. 3, the tube 1, collar 3 and ring 4 of Fig. 2 have been combined with a tubing 12 having a union fitting 13 fixedly secured to the end thereof. The fitting 13 is provided with a counterbore 14, equivalent in diameter to the inside diameter of the flange 5. The outer extremity of the counterbore 14 terminates in an outwardly extending conical surface 15 forming an annular space blending into external threads provided in the fitting 13. It is the essence of this invention that the cross-sectional area of the ring 4 approximately approaches but never exceeds the cross-sectional area of the annular space formed by the outer surface of the tubing 1 and the surfaces 7 and 15, i. e., assuming the latter surfaces to be extended to a meeting with the outer surface of the tubing 1. Since the resilient material of the ring 4 is non-compressible, provision of less annular space than ring volume insures inward crushing of the tubing, in the event excessive ring material is unable to escape through the gap 6 and counterbore 14. Such inward crushing of tubing 1 would seriously reduce the carrying capacity of the conduit system connected therewith. In assembling the several members 2 and 3 to produce the joint, the ring 4 will initially have line contact between said members and the pipe and as the collar 3 and fitting 2 are threaded together into finally and fixedly secured relation, the ring will be deformed to produce surface contacts between said parts respectively and thereby increase the frictional gripping effect.

The following test data have an important bearing upon applicant's invention. A piece of commercial .049" x 1.25" O. D. aluminum tubing eleven inches in length, was secured to a testing machine in the following manner. A fitting, duplicating the fitting 2 of Fig. 1, was fixed normal to a stationary fluid conduit. A second fitting, similar to the above, was fixed normal to the draw-bar spaced from and parallel to said fluid conduit. Two resilient rings and two collars similar to the collar 3 and ring 4 of Fig. 1 were next slipped over the ends of the aforementioned aluminum tubing, which was thereafter inserted within and screwed fast to both of the fittings referred to above in a manner identical to that shown in Fig. 1. Prestone, at room temperature was thereupon introduced into the aluminum tube and maintained therewithin under a constant pressure of 40 pounds per square inch. Upon completion of the aforementioned set-up, the draw-bar was subjected to 1750 longitudinal strokes per minute, of one-quarter inch magnitude, for a period of 1000 hours. Other than brief overhaul of the electric motor driving the draw-bar of the testing machine, at midpoint of test, the test was continuous. No adjustments were made between collars and fittings. The test terminated without applicant's invention having developed any fluid leakage whatsoever.

While applicant has illustrated deformation of an annular ring of true circular cross-section into an annular ring of equilateral triangular cross-sectional area, it is self-evident that ring deformation resulting in any one of several species of polygonal cross-sections might equally well be applied. As the number of the sides of such polygonal cross-sections are increased, the deformation reaction becomes increasingly less effective. Inversely, with the triangular space of Fig. 1, increase of the included angle between the surfaces 7 and 9 of Fig. 1, or 7 and 15 of Fig. 3, with corresponding foreshortening of side lengths as compared to the base length formed by the outer surface of the tube 1, produces an increasingly severe deformation reaction, which finds its maximum as the elastic limit of the annular ring 4 is reached.

I claim:

1. A coupling for joining separable members comprising, in combination with the members to be connected, an annular resilient deformable sealing element having a predetermined cross-sectional configuration and adapted to surround and contact with one of the members and to contact with the adjoining end face of the other member, a clamping member surrounding said first-mentioned member and adapted to contact with said sealing element and to be secured to said second-mentioned member, the sealing element contacting surface of said clamping member forming with the sealing element contacting surfaces of said first and second-mentioned members an annular space of cross-sectional configuration different from that of said sealing element but having cross-sectional areas substantially equal to the corresponding cross-sectional areas of said sealing element so that when said members are secured together the sealing element will be substantially confined within said space but deformed to materially increase the contacting area and frictional gripping effect between said sealing element and said first-mentioned member.

2. A coupling for flexibly connecting separable members comprising, in combination with the members to be connected, an annular resilient deformable sealing element of cross-section of predetermined configuration surrounding and contacting with one of said members and a clamping member surrounding said first-mentioned member and adapted to be secured to the other of said members, said clamping member and said second-mentioned member having at their adjoining ends inwardly converging surfaces, respectively, that form with the surfaces of said first-mentioned member an annular space to receive said sealing element, said annular space having cross-sectional areas substantially equal to the corresponding cross-sectional areas of said sealing element but of different configuration to provide initially substantially line contact therebetween so that when said members are fixedly secured together the sealing element will be substantially confined within said space but deformed to materially increase the contacting area and frictional gripping effect between said sealing element and said first-mentioned member.

3. A coupling for flexibly connecting separable members comprising, in combination with the members to be connected, an annular resilient deformable sealing element of substantially circular cross-section surrounding and contacting with one of said members and a clamping member surrounding said first-mentioned member and adapted to be secured to the other of said members, said clamping member and said second-mentioned member having at their adjoining ends inwardly converging conical surfaces, respectively, that form with the surfaces of said first-mentioned member an annular space to receive said sealing element, said annular space being substantially triangular in cross-section and having cross-sectional areas substantially equal to the corresponding cross-sectional areas of said sealing element so that when said members are fixedly secured together the sealing element will be substantially confined within said space but deformed to materially increase the contacting area and frictional gripping effect between said sealing element and said first-mentioned member.

JAMES B. BRELSFORD.